Jan. 17, 1939.     H. W. PRICE     2,144,032
CLUTCH CONTROL MECHANISM
Filed Feb. 19, 1932     2 Sheets-Sheet 1

INVENTOR.
HAROLD W. PRICE
BY H. O. Clayton
ATTORNEY

Jan. 17, 1939. H. W. PRICE 2,144,032
CLUTCH CONTROL MECHANISM
Filed Feb. 19, 1932 2 Sheets-Sheet 2

INVENTOR.
HAROLD W. PRICE
BY H. O. Clayton
ATTORNEY

Patented Jan. 17, 1939

2,144,032

UNITED STATES PATENT OFFICE 2,144,032

CLUTCH CONTROL MECHANISM

Harold W. Price, South Bend, Ind., assignor to Bendix Aviation Corporation, South Bend, Ind., a corporation of Delaware Application February 19, 1932, Serial No. 594,102

10 Claims. (Cl. 192—.01)

This invention relates in general to vacuum operated power mechanism for operating the clutch mechanism of an automotive vehicle and in particular to a relay valve structure adapted to supplement the usual three-way valve in effectively controlling the operation of the fluid motor of the power mechanism.

It is the principal object of the invention to improve upon the clutch operating mechanism disclosed in the patents to Ross I. Belcia, No. 1,470,272, dated October 9, 1923, and Harold E. Morehouse, No. 1,524,634, dated January 27, 1925, the Belcia patent disclosing the general combination of a clutch operating vacuum motor controlled by a three-way valve, the latter being operated by the accelerator pedal, and the Morehouse patent disclosing a power operated valve for controlling the operation of the vacuum motor.

To the above end there is provided a power operated relay control valve, preferably mounted directly on the clutch controlling motor unit, and which is operative to expedite the venting of the motor to effect a quicker engagement of the clutch. The relay valve is characterized by its connection with the motor whereby the valve is caused to be operated by virtue of the variance of pressures or rather the unequal distribution of air within the motor, there being provided a direct unimpeded connection between a particular part of the motor and the valve solely for the purpose of operating the latter.

A further object of the invention is to provide a relay valve, rendered operable by the operation of a manually operated valve and effective to control the admission of a power fluid to the suction end of a double-ended clutch operating motor to thereby speed up the engagement of the clutch.

Yet another object is to provide a relay valve power operated to both open and close the valve to effect the engagement and disengagement of the clutch, respectively, the closing of the valve being effected either by differentials of fluid pressure or by a spring.

Yet another object is to simplify the structure of the relay valve to insure a uniform and efficient operation of the same under all conditions of service.

Other objects of the invention and details of construction will be apparent from the following detailed description of certain preferred embodiments of the invention taken in conjunction with the accompanying drawings, in which.

Figure 5:
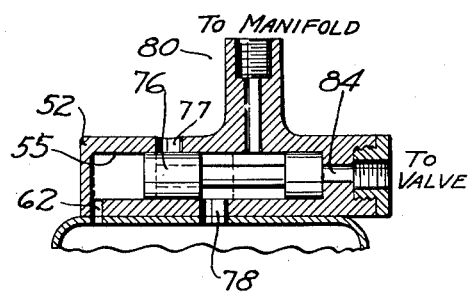
Figure 7:
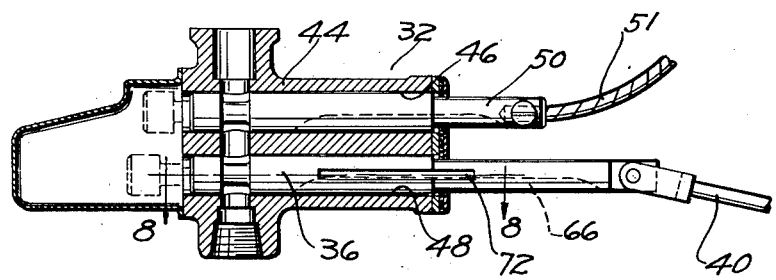
Figure 4:
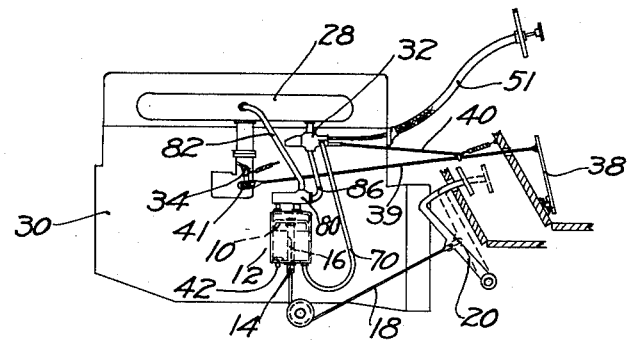
Figure 4 is a view similar to Figure 1 disclosing diagrammatically yet another modification of the relay valve.
Figure 6:
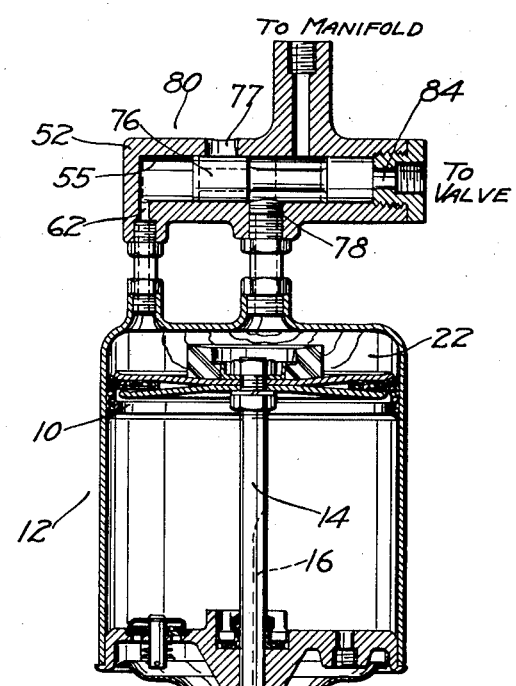
Figure 8:
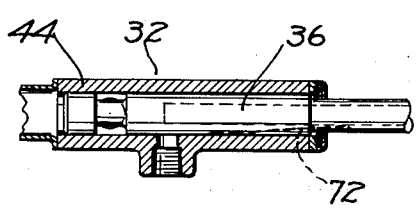

Figure 5 discloses, in longitudinal section, the details of the relay valve of Figure 4;

Figure 6 is a longitudinal sectional view disclosing the details of the clutch operating motor and relay valve of Figure 4;

Figure 7 is a sectional view disclosing the details of the manually operable primary valve unit; and Figure 8 is a section taken on line 8—8 of Figure 7 disclosing the details of the bleed valve structure.

Figure 1:
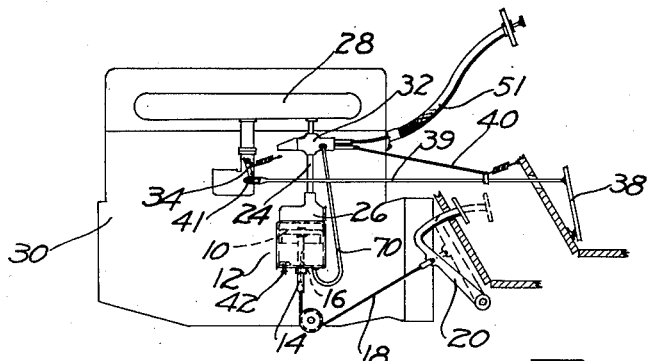
Figure 1 is a diagrammatic view of a vacuum operated clutch control mechanism embodying the relay valve structure constituting my invention.

There are disclosed diagrammatically in Figures 1 and 4 the essential elements of an engine operated vacuum clutch control mechanism similar in general operation to that disclosed in the patent to Belcia, No. 1,470,272. A piston 10 of a double-ended vacuum operated motor 12 is connected, by a rod 14, slotted at 16, and by a flexible cable 18 with a conventional clutch pedal 20. The motor is adapted to be energized and de-energized to operate the clutch by alternately evacuating and venting the upper compartment 22 thereof; to this end there is provided a flexible conduit 24 interconnecting a relay valve structure 26, mounted on the motor 12, with the intake manifold 28 of an internal-combustion engine 30 of the vehicle, and there is interposed in said conduit, Figure 1, a primary valve unit 32 serving in part to control the operation of the aforementioned relay valve, the latter directly controlling the operation of the clutch motor.

As is well-known to those skilled in this art, there exists in the manifold 28 a vacuum of some twenty inches of mercury when the engine throttle 34 is closed and the engine pistons are functioning as miniature pumps. A three-way primary control valve 36, Figure 7, one of the valve elements of the valve unit 32, may be manually operated by an accelerator pedal 38 to effect an operation of the secondary or relay valve unit 26 to place the clutch motor in circuit with the manifold when the throttle is closed, evacuating the upper compartment 22 of the clutch motor and disengaging the clutch, as disclosed in Figure 1. The accelerator 38 is connected to the throttle 34 and valve 36 by links 39 and 40, respectively, there being provided a lost motion connection at 41 between the link 39 and throttle to insure an operation of the valve 34 before the throttle is opened. A check valve 42 in the clutch motor is automatically operated to admit the atmosphere to effect this power stroke of the motor.

With the opening of the throttle the aforementioned primary control valve is again operated to effect an operation of the relay valve to vent the upper compartment of the clutch motor, all as will be more completely brought out in the detailed description to follow. The aforementioned description indicates in a general way the operation of the clutch control mechanism old in the art as disclosed in the patents referred to.

Passing now to a more complete description of the structure and operation of the primary and secondary valve units 32 and 26, respectively, the latter forming the subject matter of the present invention, the primary unit preferably comprises a one-piece casing member 44 provided with bores 46 and 48 housing, respectively, a cut-out valve member 50, manually operable by a Bowden control member 51, and the aforementioned primary control valve member 36, the latter, as described, being operated by means of link 40 connected with the accelerator pedal 38. The details of this valve unit 32 are not claimed herein, inasmuch as the same constitute the invention of Victor W. Kliesrath, covered by an application, No. 592,170, filed February 10, 1932.

Figure 2:
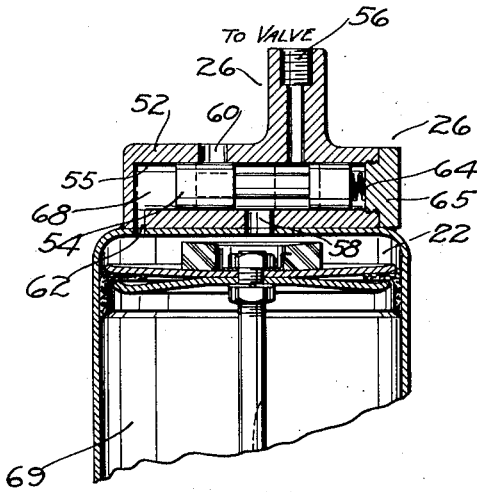
Figure 2 is a partial longitudinal section taken through the motor unit and relay valve and disclosing the details of the latter.

Referring now to the relay or secondary valve structure disclosed in detail in Figure 2, the same preferably comprises a casing 52 mounted on the casing of the clutch motor 12. A reciprocable spool-shaped piston member 54 is slidable within a bore 55 of the casing 52, the operation of the reciprocable member serving to alternately place the interior of the clutch motor in communication with either the manifold or with the atmosphere via manifold, motor and atmospheric ports 56, 58 and 60, respectively.

According to an important feature of the invention one end of the relay valve casing is provided with a port 62 constituting means interconnecting the end of the relay valve with a corner portion of the motor spaced from the opening 58. According to another feature of the relay valve structure a spring 64 is secured to one end of the valve member 54 and at its other end to the plug 65 and serves as a return spring for the valve member as will be described in detail hereinafter.

Referring now to the specific operation of the mechanism thus far described, the spool valve member 54 of the relay valve will assume the position indicated in Figure 2 in its inoperative position with the motor of the vehicle in operative. The control valve member 36 is, at this time, positioned as indicated in Figure 7 to interconnect the manifold 28 with the manifold port 56 of the relay valve; the cut-out valve 50 is, at this time, positioned as disclosed in Figure 7 to permit this interconnection. Upon starting the engine of the vehicle there is created the aforementioned vacuum in the intake manifold whereupon the clutch motor will be evacuated via the open valve unit 32, the relay valve and the conduit 24 to evacuate the motor and effect a disengagement of the clutch. It will be noted that the atmospheric port 60 is, at this time, covered by the left end of the spool piston member 54, the air being drawn through the middle or recessed portion of the member 54 via ports 56 and 58.

When it is desired to reengage the clutch after the operation of the transmission in placing the same in low gear preparatory to starting the car, the accelerator 38 is depressed to open the engine throttle, the first movement of the accelerator having no effect upon the throttle by virtue of the lost motion connection at 41. This initial movement of the accelerator, however, serves to operate the primary three-way control valve member 36, first cutting off the connection with the manifold and then placing the relay valve 26 in communication with the atmosphere via a slot 66 in the control valve member. Further depression of the accelerator pedal serves, of course, to open the throttle and accelerate the engine 30. With the admission of the atmosphere to the middle portion of the movable relay valve member 54 a pressure differential is set up in the valve by virtue of the then existing evacuation of a left end portion 68 of the bore 55. The valve is thus rapidly moved to the left, closing off the connection with the atmosphere via manifold port 56 and opening the atmospheric port 60 to dump a large amount of air into the upper compartment 22 of the motor to effect an engagement of the clutch. The ports 58 and 60 are made larger than the port or duct 56 in order to insure a rapid influx of air into the motor.

The clutch plate movement is relatively rapid, under the action of the clutch spring, during the first part of its throw, due to a rather rapid efflux of air from the non-suction or compression compartment 69 of the clutch motor via the slot 16 in the connecting rod 14. When this slot is completely covered by virtue of the movement of the connecting rod, the last stage of the clutch plate movement is controlled by the efflux of air from the compression side of the motor via a conduit 70 connected with the valve unit 32 to register with a tapered slot 72 in the control valve member 36. This bleed valve structure also forms part of the aforementioned application No. 592,170 and is not claimed herein.

The rate of clutch plate movement during the last stage is controlled by the position of the accelerator pedal, which determines the depth of taper of the slot 72 in registry with the conduit 70 to thus determine the quantity of air passing from the motor.

Referring again to the operation of the relay valve in the engagement of the clutch, the spring 64 is elongated, under the action of the aforementioned pressure differential, until the force exerted by the expanded spring is equal to the force measured by said differential, whereupon the spool valve member 54 is quickly moved to the right to its original position to cut off the connection with the atmosphere via port 60, the remaining air entering the upper chamber 22 being admitted via the valve unit 32 and the aforementioned relatively restricted duct 56.

Figure 3:
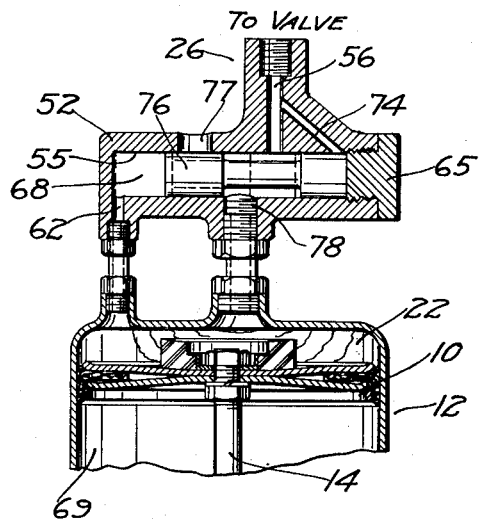
Figure 3 is a view similar to Figure 2 disclosing a modified form of relay valve.

There is thus provided a fluid power operation of the relay valve controlled in part by the accelerator operated control valve 36 and in part by the degree of vacuum within the clutch motor to effect a quick dumping of air into the clutch motor to provide a very quick movement of the clutch plate during the first part of its throw. The total elapsed time consumed in effecting the engagement of the clutch is thus reduced to a minimum. It will also be noted that the pulling action of the clutch springs serves to create a vacuum within the upper compartment of the clutch motor and that inasmuch as the closing of the relay valve is a function of this vacuum, that the valve will automatically close when the clutch plates contact. Thus should the mechanism be improperly adjusted by virtue of the position of the slot 16 with respect to the clutch engaging position of the clutch plates, then the relay valve would nevertheless materially retard the engagement of the clutch when the clutch plates come into contact, this engagement being cushioned by virtue of the restriction 56. Structure including the slot 16 and bleed valve will of course ultimately come into action to further cushion the engagement when the upper end of the slot is covered by the end wall of the motor. There is thus provided in effect two separate and distinct means, one automatic in action and the other a function of position, for cushioning the clutch engagement.
It will be noted that the relay valve member 54 is now in a position to repeat the aforementioned cycle of operations which will be effected upon opening and closing the throttle thus operating the clutch during the gear shifting operation or to effect a free wheeling operation of the vehicle.
There is disclosed in Figure 3 a modified form of relay valve structure the spring 64 of the relay valve of Figure 2 being omitted. In this modification there is provided a by-pass duct 74 interconnecting the duct 56 and the extreme right end of the valve bore 55. The relay valve may also be spaced from the cylinder as disclosed.
Describing the operation of the relay valve of the latter modification, a piston 76 is positioned as indicated in Figure 3 during the evacuation of the motor. Upon operation of the primary three-way control valve unit to vent the clutch motor, the piston of the relay valve moves, by virtue of the pressure differential set up, to the extreme left position indicated in dotted lines in Figure 3 to thereby cut off communication with the manifold and dump the air into the clutch motor via an atmospheric port 77 and a motor port 78 to effect the desired quick first stage of clutch engaging movement.
With this modification, however, the piston 76 remains in the aforementioned extreme left position by virtue of its frictional contact with the bore of the valve casing. In order therefore to again effect a disengagement of the clutch it is necessary to return the piston to its original position. This is accomplished by release of the accelerator pedal to actuate the control valve whereupon the right end compartment of the relay valve will be evacuated via the by-pass 74 setting up a pressure differential to move the piston valve member to the right to again intercommunicate the manifold with the motor to effect a disengagement of the clutch.
There is disclosed diagrammatically in Figure 4 and in Figures 5 and 6, a further modified form of relay valve 80 wherein there is provided a direct connection between the manifold and valve by means of a conduit 82. A right end compartment 84 of the valve is connected directly with a primary control valve unit by a separate flexible connection 86. Otherwise the construction is the same as that disclosed in Figure 3.
The operation of this form of relay valve is similar in general to the operation of the valve disclosed in Figure 3 with the exception that the direct connection between the manifold and relay valve provides for a slightly quicker evacuation of the clutch motor by virtue of the fact that the evacuation of the motor is initiated when the closing movement of the throttle is initiated and before the primary control valve unit is opened. The connection 86 in this modification performs the same service as the single connection 24 of Figure 1, for in the latter modification the by-pass conduit 74 serves to intercommunicate the manifold with the right end of the relay valve member to actuate the valve member.

In all embodiments of the relay valve it is to be particularly noted that there is provided a direct connection between the valve and a portion of the clutch motor isolated from the intake or aforementioned motor port. This isolation insures a certain lag in establishing a uniformity of air content or pressure within the motor at the mouth of the motor port and within the left compartment of the relay valve, and this lag in turn insures the heretofore described operation of the relay valve. Such a distribution of air is disclosed diagrammatically in Figure 3 just as the air is admitted to the cylinder to effect the engagement of the clutch, the valve having been moved to its dotted line position to the left.

There is thus provided a very simple, efficient and compact form of power operated relay valve which will insure a quick engaging operation of the clutch.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. Vacuum operated clutch controlling mechanism comprising, in combination with a motor and a manually operated valve for said motor, a relay control valve for said motor, a fluid transmitting connection interconnecting said manually operated valve and said relay valve, and a plurality of fluid transmitting connections between said relay valve and motor.

2. Vacuum operated clutch controlling mechanism comprising, in combination with a clutch motor and a manually operated valve for said motor, a relay control valve for said motor, a fluid transmitting connection interconnecting said manually operated valve and said relay valve, and a plurality of fluid transmitting connections between said relay valve and motor, said latter connections serving collectively to transmit the power fluid to and from the motor to energize and deenergize the latter and to transmit the power fluid to aid in the operation of the relay valve.

3. Vacuum operated clutch controlling mechanism comprising, in combination with a clutch motor and a manually operated valve for said motor, a relay control valve for said motor, a fluid transmitting connection interconnecting said manually operated valve and said relay valve, and two fluid transmitting connections between said relay valve and motor, said connections serving collectively to transmit the power fluid to and from the motor to energize and deenergize the latter and to transmit the power fluid to aid in the operation of the relay valve, one of said latter connections interconnecting one end of the motor with one end of the relay valve and the remaining connection interconnecting the aforementioned end of the motor with an intermediate portion of the relay valve.

4. Vacuum operated clutch controlling mechanism comprising, in combination with a motor and a manually operated valve for said motor, a relay control valve for said motor comprising a casing member and a spool-shaped reciprocable piston member mounted for slidable movement within said casing, a fluid transmitting connection interconnecting said manually operated valve and the interior of said relay valve member, and a plurality of fluid transmitting connections interconnecting said relay valve and motor.

5. A clutch controlling mechanism comprising a double-ended fluid operated motor, manually operated three-way and bleed valves connected respectively to different ends of the motor, and a relay valve member rendered operable by fluid pressure controlled by the aforementioned three-way valve and operative, by cooperating with the aforementioned bleed valve, to effect a controlled clutch engaging operation of the motor.

6. A clutch controlling mechanism comprising a double-ended fluid operated motor, manually operated three-way and bleed valves connected respectively to different ends of the motor, and a relay valve member rendered operable by fluid pressure controlled by the aforementioned three-way valve and operative, by cooperating with the aforementioned bleed valve, to effect a controlled clutch engaging operation of the motor, said relay valve serving, by virtue of its connection with the motor, to speed up the first stage of clutch engagement, the last stage being controlled by the bleed valve.

7. A clutch controlling mechanism comprising a double-ended fluid operated motor, manually operated three-way and bleed valves connected respectively to different ends of the motor, and a double-acting fluid operated relay valve member rendered operable by the aforementioned three-way valve and operative, by cooperating with the aforementioned bleed valve, to effect a controlled clutch engaging operation of the motor.

8. A clutch controlling mechanism comprising a double-ended fluid operated motor, manually operated three-way and bleed valves connected respectively to different ends of the motor, and a double-acting fluid operated relay valve member rendered operable jointly by fluid pressure controlled by the aforementioned three-way valve and by virtue of an independent connection with the motor, and operative, by cooperating with the aforementioned bleed valve, to effect a controlled clutch engaging operation of the motor.

9. A power operated clutch controlling mechanism of the class described comprising, in combination with clutch mechanism, an internal-combustion engine, an accelerator operated means for controlling the throttle of the engine, a vacuum operated motor for controlling the engagement and disengagement of the clutch mechanism, an accelerator operated primary control valve for said motor a relay or secondary motor control valve, and a fluid transmitting connection interconnecting the relay valve and motor, said relay valve being controlled by the primary valve and by the vacuum of said motor and is operative to control the operation of the clutch controlling motor to effect a relatively rapid engagement of the clutch.

10. Clutch control mechanism for an automotive vehicle provided with a clutch comprising in combination, a pressure differential operated motor operably connected with the clutch, a primary control valve operative to initiate the disengaging and engaging operations of said motor, and other valve means, controlled in part by said primary valve and in part by the degree of fluid pressure within said motor, for controlling the clutch engaging operation of said motor.

HAROLD W. PRICE.